United States Patent [19]

Mc Eachern

[11] 4,441,173

[45] Apr. 3, 1984

[54] VERY LOW FREQUENCY HYDROPHONE CALIBRATION

[75] Inventor: James F. Mc Eachern, State College, Pa.

[73] Assignee: The United States of America as represented by the Secretary of the Navy, Washington, D.C.

[21] Appl. No.: 358,982

[22] Filed: Mar. 17, 1982

[51] Int. Cl.³ .......................................... H04R 29/00
[52] U.S. Cl. .................................... 367/13; 73/1 DV
[58] Field of Search ................ 367/13; 73/1 D, 1 DV

[56] References Cited

U.S. PATENT DOCUMENTS

| | | | |
|---|---|---|---|
| 2,597,005 | 5/1952 | Kendall | 367/13 |
| 2,647,813 | 8/1953 | Watson | 367/13 |
| 3,167,150 | 1/1965 | Darby et al. | 367/13 |
| 3,224,246 | 12/1965 | Schloss et al. | 367/13 |
| 3,303,688 | 2/1967 | Hickman et al. | 367/13 |
| 3,859,620 | 1/1975 | Percy | 367/13 |
| 3,864,664 | 2/1975 | Trott et al. | 367/13 |
| 3,913,062 | 10/1975 | Spurlock | 367/13 |
| 4,205,394 | 5/1980 | Pickens | 367/13 |

OTHER PUBLICATIONS

Bouche, *Instruments and Control Systems,* Aug. 1961, pp. 1451, 1452.
Navy Technical Disclosure Bulletin, vol. V, No. 4, Apr. 1980, pp. 5–8, Roland A. Bender, "Sea State & Ocean Current Simulator for Sonobuoys".

*Primary Examiner*—Richard A. Farley
*Attorney, Agent, or Firm*—Robert F. Beers; Henry Hansen; Armand M. Vozzo, Jr.

[57] ABSTRACT

An improved system is disclosed for calibrating acoustic pressure-sensitive transducers, particularly hydrophones, down to frequencies in the sub-Hertz range. A transducer under test and a reference transducer, both electrically connected to a voltage measuring device, are mounted in aligned proximity to each other upon a pivotal rocker arm immersed in a water tank. A cam and follower unit driven by a motor oscillates the rocker arm so that the transducers are moved through a vertical displacement equivalent to the desired fluctuation of hydrostatic pressure. As a result, calibrations down to 0.01 Hz are achieved.

8 Claims, 1 Drawing Figure

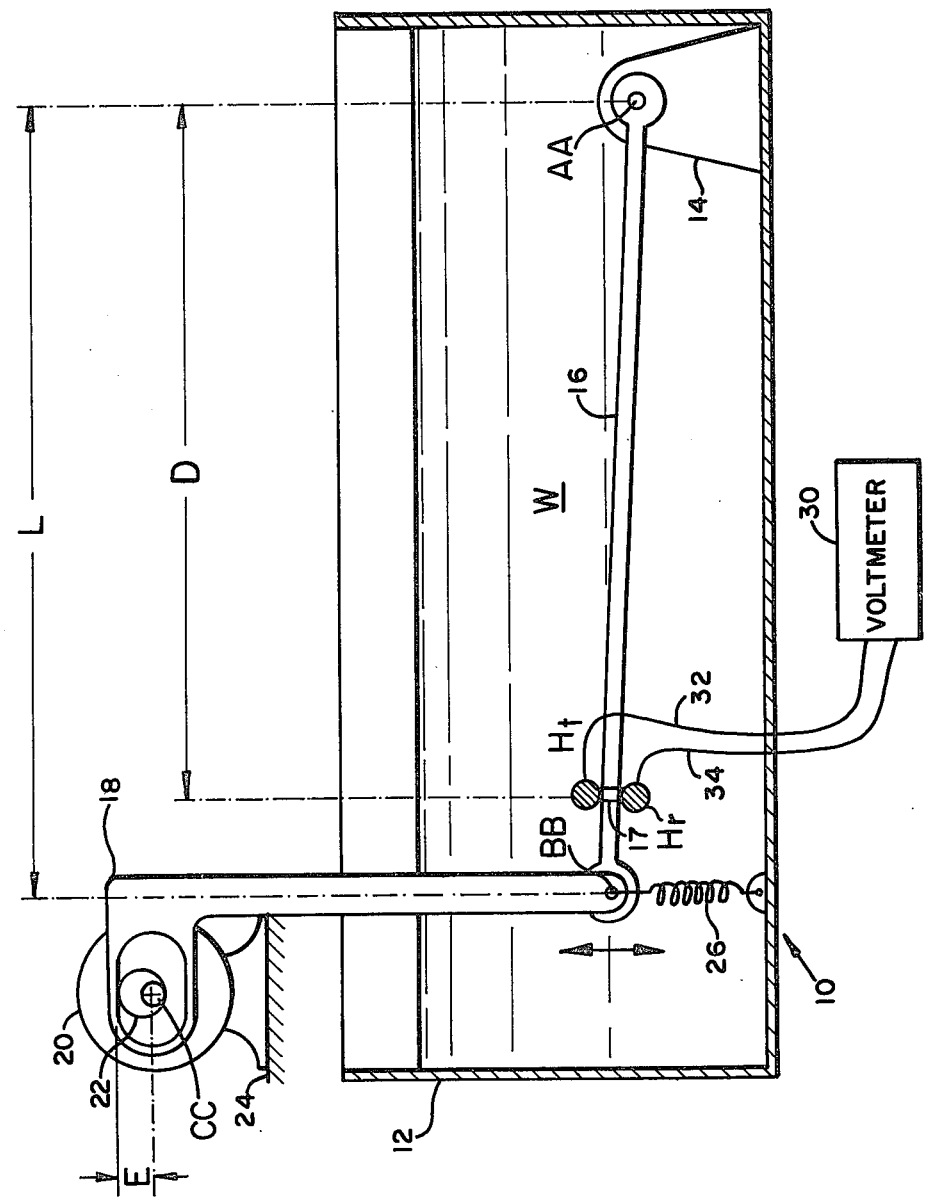

VERY LOW FREQUENCY HYDROPHONE CALIBRATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the calibration of pressure-sensitive hydrophones and more particularly to an improved system for calibrating hydrophones down to very low frequencies.

In the field of underwater acoustic signal detection, pressure-sensitive hydrophones, individually and oftentimes collectively in linear arrays, are relied upon to produce meaningful electrical signals in response to waterborne sonic waves. To accurately interpret the acoustic information contained in these electrical signals, it is necessary to calibrate hydrophones in a working environment so that a baseline frequency response is provided for a particular hydrophone over a complete acoustic frequency range. Of particular value is the ability to calibrate hydrophone systems in the lower portion of the infrasonic range, generally less than 10 Hz, because of potential inaccuracies produced by extrapolating the results of higher audio frequency testing. In addition, very low frequency hydrophone systems are being developed that are in need of an effective and reliable means for measuring their sensitivity.

Pressure hydrophones have been typically calibrated in tanks or small lakes with known signals from an acoustic projector. These projectors generally have physical parameters that limit their outputs to frequencies at or above 10 Hz, and only extremely large, awkward devices have been able to produce acoustic pressure signals down to about 5 Hz. As a result, calibrations may be performed acoustically down to 5–10 Hz, but extrapolation is required in order to determine lower frequency responses.

SUMMARY OF THE INVENTION

Accordingly, it is a general purpose and object of the present invention to provide an improved system for accurately calibrating acoustic pressure-sensitive transducers, particularly hydrophones, at very low frequencies in the infrasonic range.

A further object of the present invention is to provide an improved calibrator that effectively measures the sensitivity of very low frequency sonic systems at frequencies below 1 Hz.

A still further object of the present invention is to provide a calibration system for very low frequency pressure hydrophones that is simple yet reliable in performance, and relatively easy and inexpensive to construct.

Briefly, these and other objects of the present invention are accomplished by an improved system for calibrating acoustic pressure-sensitive transducers, particularly hydrophones, down to frequencies in the sub-Hertz range. A transducer under test and a reference transducer, both electrically connected to a voltage measuring device, are mounted in aligned proximity to each other upon a pivotal rocker arm immersed in a water tank. A cam and follower unit driven by a motor oscillates the rocker arm so that the transducers move through a vertical displacement equivalent to the desired fluctuation of hydrostatic pressure. As a result, calibrations down to 0.01 Hz are achieved.

For a better understanding of these and other aspects of the present invention, reference may be made to the following detailed description taken in conjunction with the accompanying drawing.

BRIEF DESCRIPTION OF THE DRAWING

The drawing is a side elevation view of a low-frequency calibration system for acoustic pressure-sensitive transducers in accordance with the present invention.

DESCRIPTION OF THE PREFERRED EMBODIMENT

Referring now to the drawing, a calibration system 10 is shown, according to the present invention, partially immersed in a pool of water W contained in a tank 12. The calibration system 10 includes an elongated rocker arm 16 immersed in the pool of water W and pivotally connected at one end thereof to a rocker base 14 which is fixed to the bottom of tank 12 so that the arm may swing in the water about a stationary axis AA.

A test hydrophone $H_t$ being calibrated along with a reference hydrophone $H_r$ having known-frequency response characteristics are stationed together along the length of rocker arm 14 at a distance D from pivotal axis AA. The test hydrophone $H_t$ and reference hydrophone $H_r$ are removably mounted upon rocker arm 16 in aligned proximity to each other so that each hydrophone is positioned along the rocker arm at substantially the same distance D from the pivotal axis AA. A strap 17 or other conventional fastening means is used to clamp the test and reference hydrophones $H_t$ and $H_r$, respectively, in proper positions along the rocker arm 16.

In accordance with the present invention, the rocker arm 16 carrying the test and reference hydrophones $H_t$ and $H_r$ is moved up and down through the water W in an oscillating fashion using a cam 22 and associated follower 18 driven by a conventional electric motor 20. The motor 20, which may be of a relatively low power, typically about ¼ hp., is mounted on a platform 24 elevated above tank 12 for providing torque along a rotational axis CC. Equipped with a variable speed transmission to control the rate of revolution of rotational axis CC, motor 20 is geared appropriately to permit operation down to extremely slow speeds in the range of 0.5–1.0 revolution per minute.

Cam 22 is an eccentric planar member adapted to be connected to motor 20 so that the cam may revolve substantially about rotational axis CC. The cam 22 is cylindrically configured having its axis of revolution offset from its cylindrical axis and a predetermined eccentricity E, defined as the distance along a cross-sectional diameter between the axis of revolution and the perimeter of the cam. Cam follower 18 is a substantially right-angled member fabricated of a lightweight, corrosion-resistant material and formed having an oval-like opening transversely through one leg for mounting the follower upon the cam 22. The opening in cam follower 18 is sufficiently large in height and width to permit unrestricted revolution of cam 22 therein and is flattened along its top edge to permit the impartation of substantially uniform, linear motion to the follower in an upward and downward direction upon a complete revolution of the cam. The other leg of cam follower 18 is elongated and adapted to be coupled to the end of rocker arm 16 opposite pivotal axis AA along a swing axis BB that is aligned substantially parallel to and located at a length L from the pivotal axis. Rocker arm 16 is thus transmitted the substantially linear and oscillating motion of cam follower 18, as indicated by the arrows, so that the test hydrophone $H_t$ and reference hydrophone $H_r$ are both moved through the water W in substantially similar arcs about pivotal axis AA. A helical compression spring 26 coupled between swing axis BB and the bottom of tank 12 serves to prevent cam follower 18 from bounding off and dismounting cam 22 during its revolution.

The arcuate movement of the test and reference hydrophones $H_t$ and $H_r$ in the water W about pivotal axis AA changes the hydrostatic pressure head ($P_h$) on the hydrophones in accordance with their vertical displacement through the water upon rocker arm 16. For the described calibration system 10, the change in the hydrostatic pressure head ($\Delta P_h$) can be determined according to the following equation:

$$\Delta P_h = E(D/L)$$

where

E = eccentricity of cam 22 (inches),

D = longitudinal distance of the hydrophones from axis AA (inches), and

L = length of rocker arm 16 between axes AA and BB (inches).

Based upon the changes in the hydrostatic head, a fluctuating hydrostatic pressure head signal is produced having a frequency determined by the speed of motor 20. This hydrostatic pressure head signal is perceived and transduced by the hydrophones $H_t$ and $H_r$ in the same manner as they would perceive and transduce an acoustic pressure signal, the hydrophones accordingly generating respective voltage signals indicative of the hydrostatic pressure head changes. For example, as a pressure stimulus, a hydrostatic head change of 1 inch is substantially equivalent to an acoustic pressure signal of about 167 dB//$\mu$Pa. A conventional voltage measuring device 30 is coupled to both the test and reference hydrophone $H_t$ and $H_r$ via respective leads 32 and 34 for monitoring the voltage signals generated by the hydrophones and enabling their comparison.

Therefore, it should now be apparent that the disclosed invention provides an improved system for calibrating acoustic pressure-sensitive transducers, particularly hydrophone, at very low frequencies in the infrasonic range. Furthermore, the disclosed invention provides a calibration system that can effectively measure the sensitivity of very low frequency sonic systems at frequencies below 1 Hertz. In addition, the described calibration system is simple yet reliable in performance, and relatively easy and inexpensive to construct.

Obviously, other embodiments and modifications of the present invention will readily come to those of ordinary skill in the art having the benefit of the teachings presented in the foregoing description and drawing. It is therefore to be understood that various changes in the details, materials, steps, and arrangement of parts, which have been described and illustrated to explain the nature of the invention, may be made by those skilled in the art within the principle and scope of the invention as expressed in the appended claims.

What is claimed is:

1. A system for calibrating a hydrophone in water operable at very low frequencies using a reference hydrophone of known response characteristics, comprising:
    an elongated arm pivotal in the water about a substantially horizontal axis;
    means for mounting the hydrophones in aligned proximity to each other along said arm at substantially the same longitudinal distance from said pivotal axis; and
    drive means for moving said arm about its pivotal axis in substantially vertical oscillations so that the hydrophones are subjected to equivalent changes in hydrostatic pressure at the same frequency.

2. A calibration system according to claim 1, further comprising:
    voltage-measuring means coupled to the hydrophones for comparing the responses thereof to the hydrostatic pressure changes.

3. A calibration system according to claim 1, wherein said drive means comprises:
    a motor coupled to said arm for providing torque along a rotational axis; and
    cam follower means connected to said motor for imparting linear oscillatory motion to said arm.

4. A calibration system according to claim 3, wherein said cam follower means comprises:
    a cam connected to revolve about the rotational axis of said motor, said cam being cylindrically configured having a predetermined eccentricity; and
    a follower adapted to fit about said cam and formed to impart linear motion in upward and downward directions to said arm upon revolution of said cam.

5. A calibration system according to claim 4, wherein said cam follower means further comprises:
    a spring connected to said follower to continuously maintain contact between said follower and said cam during revolution thereof.

6. A calibration system according to claim 1, wherein said drive means is variable-speed and comprises:
    a variable-speed motor coupled to said aim for torque along a rotational axis at adjustable rates of revolution; and
    cam follower means connected to said motor for imparting linear oscillatory motion to said arm.

7. A calibration system according to claim 6 wherein said cam follower means comprises:
    a cam connected to revolve about the rotational axis of said motor, said cam being cylindrically configured having a predetermined eccentricity; and
    a follower adapted to fit about said cam and formed to impart linear motion in upward and downward directions to said arm upon revolution of said cam.

8. A calibration system according to claim 7, wherein said cam follower means further comprises:
    a spring connected to said follower to continuously maintain contact between said follower and said cam during revolution thereof.

* * * * *